United States Patent [19]

Woerner et al.

[11] 4,120,884

[45] Oct. 17, 1978

[54] STORAGE-STABLE, LIQUID POLYISOCYANATES POSSESSING CARBODIIMIDE GROUPS, AND PROCESS FOR THEIR MANUFACTURE

[75] Inventors: Frank Peter Woerner, Mutterstadt; Peter T. Kan, Ludwigshafen; Georg Falkenstein, Neustadt, all of Fed. Rep. of Germany

[73] Assignee: BASF Aktiengesellschaft, Ludwigshafen, Fed. Rep. of Germany

[21] Appl. No.: 763,647

[22] Filed: Jan. 28, 1977

[30] Foreign Application Priority Data

Feb. 18, 1976 [DE] Fed. Rep. of Germany ....... 2606419

[51] Int. Cl.$^2$ .......................................... C07C 119/055
[52] U.S. Cl. ......................... 260/453 SP; 260/453 A; 260/453 AR; 260/453 AM; 260/453 AL
[58] Field of Search ................. 260/453 AR, 453 AL, 260/453 A, 453 AM, 2.5 BF, 453 SP

[56] References Cited

U.S. PATENT DOCUMENTS 4,014,935  3/1977  Ibbotson .................. 260/2.5 BF

FOREIGN PATENT DOCUMENTS 1,404,301  8/1975  United Kingdom.

*Primary Examiner*—Dolph H. Torrence
*Attorney, Agent, or Firm*—Keil, Thompson & Shurtleff

[57] ABSTRACT

Storage-stable, liquid, only slightly colored polyisocyanates possessing carbodiimide groups and having an isocyanate content of from about 25 to 35% by weight, based on total weight; these products are obtained by condensing polyisocyanates in the presence of phospholines, phospholidines and/or their oxides, and stopping the condensation and stabilizing the condensation products with the Lewis acids, aromatic carboxylic acid halides, aromatic sulfonic acid esters and/or alkyl sulfates.

8 Claims, No Drawings

STORAGE-STABLE, LIQUID POLYISOCYANATES POSSESSING CARBODIIMIDE GROUPS, AND PROCESS FOR THEIR MANUFACTURE

The present invention relates to storage-stable, liquid polyisocyanates possessing one or more carbodiimide groups and having an isocyanate content of from 25 to 35% by weight, based on total weight, and to a process for their manufacture.

The manufacture of polycondensation products possessing carbodiimide groups has been disclosed. According to the description in German Pat. No. 1,130,594, these products are obtained by condensing organic compounds, which may or may not be of high molecular weight, and which possess at least two isocyanate groups in a chemically bonded form, in the presence of from 0.01 to 10% by weight, based on the weight of the polyisocyanate, of phospholines or phospholidines, or their oxides, as catalysts, at from room temperature to 300° C. The polycondensation products possessing carbodiimide groups have molecular weights of not less than 750 and can be used for the manufacture of moldings, fibers, films and sheets.

Further, German Laid-Open Application DOS 2,245,634 discloses adducts, consisting of phospholine oxides, phospholine sulfides, phospholane oxides or phospholane sulfides and monoalcohols, dialcohols and/or polyalcohols of moolecular weight from 32 to 250, proton acids, metal salts or acid chlorides as catalysts for the manufacture of foams possessing carbodiimide groups. Because of thier high activity, the said catalysts are exceptionally suitable for the manufacture of resins or foams possessing carbodiimide groups, but not for the manufacture of polyisocyanates possessing carbodiimide groups.

According to German Published Application No. 1,668,083, polyisocyanates possessing carbodiimide-isocyanate adducts are manufactured by heating organic polyisocyanates, in the presence of from 0.01 to 10 mole percent of organic compounds, possessing isocyanate groups and biurets, urea, amide, urethane, allophanate, isocyanurate, uretdione or uretonimine groups, as catalysts, to above 150° C., and cooling the resulting reaction products to room temperature.

Further, according to German Published Application No. 1,593,619, storage-stable, liquid isocyanate adducts based on 4,4'-diphenylmethane-diisocyanate are obtained by heating the said diisocyanate at from 160° to 250° C. in the presence of from 0.01 to 3% by weight of a trialkyl phosphate, trialkenyl phosphate, triaralkyl phosphate, triaryl phosphate, tricycloalkyl phosphate or tricycloalkenyl phospate. It is a disadvantage of the said process that the condensation must be carried out in the presence of relatively large amounts of catalyst, at above 150° C., so that, in addition to the desired adducts possessing carbodiimide groups numerous by-products, e.g. by-products based on isocyanurates, are formed, and that the condensation products exhibit low stability on storage, since the reaction is merely stopped by cooling the reaction mixture, so that the condensation progresses continuously, albeit more slowly, at room temperature.

It is a further disadvantage that because of the high reaction temperature used the carbodiimide adducts exhibit a relatively dark discoloration and contain varying amounts of solid matter as by-products which must be removed, entailing additional process costs.

It is an object of the present invention to manufacture, under relatively mild reaction conditions, storage-stable, liquid polyisocyanates possessing carbodiimide groups, which do not suffer from the above disadvantages.

Accordingly, the present invention provides storage-stable, liquid polyisocyanates possessing carbodiimide groups, which contain from about 25 to 35% by weight, based on the total weight, of NCO groups, the said products being obtained by condensing polyisocyanates in the presence of phospholines, phospholidines and/or their oxides as a catalyst, and stopping the condensation and stabilizing the condensation products by means of Lewis acids, aromatic carboxylic acid halides, aromatic sulfonic acid esters and/or alkyl sulfates.

The invention further relates to a process for the manufacture of storage-stable liquid polyisocyanates possessing carbodiimide groups, by condensing polyisocyanates in the presence of phospholines, phospholidines, phospholine oxides and/or phospholidine oxides as the catalyst, wherein the condensation is stopped, after reaching a content of NCO groups of from about 25 to about 35% by weight, based on the total weight, by means of Lewis acids, aromatic carboxylic acid halides, aromatic sulfonic acid esters and/or alkyl sulfates, and at the same time the products are stabilized by these stoppers.

The polyisocyanates, possessing carbodiimide groups, according to the invention, exhibit the advantage that they contain only extremely small amounts of catalyst and virtually no by-products and that, because of the mild reaction conditions, they are only slightly colored or even virtually colorless. Furthermore, the process is extremely economical since the equipment does not require any parts which permit sudden chilling of the reaction mixture.

All aliphatic, cycloaliphatic, araliphatic and, preferably, aromatic diisocyanates and/or higher polyisocyantes may be used for the manufacture of the polyisocyanates possessing carbodiimide groups. Specific examples which may be mentioned are aliphatic diisocyanates, e.g. tetramethylene-diisocyanate, decamethylene-diisocyanate and preferably hexamethylene-diisocyanate, cycloaliphatic diisocyanates, e.g. 1,4-cyclohexyl-diisocyanate, isophorone-diisocyanate and 4,4'-diisocyanatodicyclohexylmethane, araliphatic diisocyanates, e.g. xylylenediisocyanates and, preferably, aromatic diisocyanates, e.g. 1,3- and 1,4-phenylene-diisocyanate, 1,5-naphthalene-diisocyanate, 2,4- and 2,6-toluylene-diisocyanate and the corresponding isomer mixtures, 2,2'-, 2,4'- and 4,4'-diphenylmethane-diisocyanates and the corresponding isomer mixtures and polyphenyl-polymethylenepolyisocyanates and mixtures of diphenylmethane-diisocyanates and polyphenyl-polymethylenepolyisocyanates. The polyisocyanates mentioned may be employed as individual compounds or in the form of mixtures. Mixtures of 4,4'-diphenylmethane-diisocyanate and 2,4- and 2,6-toluylene-diisocyanate in the weight ratio of 80:20 and, in particular, pure 4,4'-diphenyl-methane-diisocyanate, are used preferentially.

The catalysts used for the manufacture of the polyisocyanates possessing carbodiimide groups are phospholines, phospholidines and/or their oxides. The appropriate phospholines and phospholidines may be manufactured by reducing the corresponding dichlorophospholines or dichlorophospholidines with lithium aluminum hydride. These dichloro compounds are also used for the manufacture of phospholine oxides and are described, for example, in U.S. Pat. No. 2,663,736. Phospholine oxides are described in U.S. Pat. Nos. 2,663,737 and 2,663,738 and phospholidine oxides in 2,663,739. The abovementioned patents are herein incorporated by reference. Examples of suitable catalysts which may be mentioned are phospholines, e.g. 1-phenyl-3-phospholine, 3-methyl-1-phenyl-3-phospholine, 1-ethyl-3-phospholine, 3-isopropyl-1-phenyl-3-phospholine and 3-(4-methyl-3-pentenyl)-1-phenyl-3-phospholine, and phospholine oxides, e.g. 3-methyl-1-phenyl-3-phospholine-1-oxide, 1-ethyl-3-methyl-3-phospholine-1-oxide, 1-ethylphenyl-3-methyl-3-phospholine-1-oxide, 3-(4-methyl-3-pentenyl)-1-phenyl-3-phospholine-1-oxide, 3-chloro-1-phenyl-3-phospholine-1-oxide and 1,3-diphenyl-3-phospholine-1-oxide. Examples of typical phospholidines are 1-phenylphospholidine, 3-methyl-1-phenylphospholidine, 1-ethyl-3-methylphospholidine and 1-ethylphospholidine. Examples of suitable phospholidine oxides are 1-ethyl-3-methyl-phospholidine-1-oxide and 1-phenylphospholidine-1-oxide. Preferred catalysts to use are 1-phenyl-3-methyl-phospholine-1-oxide, 1-methyl-phospholine-1-oxide and 1-phenyl-3-methyl-phospholine.

According to the invention, the condensation is carried out in the presence of catalytic amounts of the above catalysts, the exact amount of catalyst for best results depending on the reactivity of the latter and of the polyisocyanate and being readily established by simple laboratory experiments. Surprisingly, we have found that the requisite amount of catalyst can be extremely low compared to the catalyst concentration used in the prior art. Advantageously, from about 0.0004 to about 0.009 part, preferably from about 0.0006 to about 0.003 part, by weight of catalyst, is used per 100 parts by weight of the organic diisocyanate and/or higher polyisocyanate. If larger amounts of catalyst are used, the formation of the carbodiimide takes place extremely rapidly and the end products obtained can only be stabilized with difficulty.

The condensation of the diisocyanates and/or higher polyisocyanates, in order to manufacture the polyisocyanates, possessing carbodiimide groups, according to the invention, can be carried out by conventional methods in solution or preferably in bulk. Any inert organic solvent can be used where the condensation is carried out in solution. Examples which may be mentioned are substituted and unsubstituted aromatics, e.g. benzene, chlorobenzene, dichlorobenzenes, trichlorobenzene, toluene and xylenes, nitromethane, acetonitrile, methyl ethyl ketone, methyl amyl ketone and anisole.

The condensation is in general carried out at from 20° C. to about 150° C., preferably from 60° to 100° C., but of course, it can also be carried out at higher temperatures; though this does not entail advantages.

Since the carbodiimide formation takes place with elimination of carbon dioxide, the course of the reaction can be monitored by, for example, continuous determination of the isocyanate content or measurement of the amount of carbon dioxide eliminated. After reaching a certain isocyanate content — which generally requires condensation times of from 10 minutes to about 24 hours, preferably from about 1 hour to about 6 hours, depending on the starting components, catalysts and reaction parameters — the carbodiimide formation is stopped and at the same time the polyisocyanate possessing carbodiimide groups is stabilized.

The stoppers and stabilizers incorporated into the reaction mixture are, according to the invention, Lewis acids, preferably Lewis acids which are soluble in organic solvents, e.g. methyl ethyl ketone, ethylene carbonate and butyl acetates, aromatic carboxylic acid halides, preferably aromatic carboxylic acid chlorides, aromatic sulfonic acid ester, preferably p-toluenesulfonic acid esters, and/or alkyl sulfates. The following have proved particularly successful and are therefore used preferentially: Lewis acids, e.g. phosphorus oxychloride, cadmium chloride, zinc chloride and especially iron-(III) chloride, aromatic carboxylic acid chlorides, e.g. p-toluic acid chloride and especially benzoyl chloride, aromatic sulfonic acid esters, e.g. methyl benzenesulfonate, ethyl benzenesulfonate, ethyl p-toluenesulfonate and especially methyl p-toluenesulfonate, and alkyl sulfates, e.g. diethyl sulfate and especially dimethyl sulfate. The amount of the above compounds used for stopping the condensation and at the same time stabilizing the end product can be varied within wide limits relative to the amount of catalyst employed. However, the preferred molar ratio of catalyst to stopper and stablizer not only depends on the reactivity of the diisocyanate and/or polyisocyanate and of the catalyst, but also on the Lewis acid employed, the aromatic carboxylic acid chloride, the aromatic sulfonic acid ester and/or the alkyl sulfate. In general, the molar ratio of catalyst to stopper or stabilizer is from about 1:2 to about 1:500, preferably from 1:5 to about 1:350. The exact molar ratios can readily be determined by means of laboratory experiments. Advantageously, the various types of compounds are employed in the following molar ratios: catalyst to Lewis acids, from 1:2 to 1:90, preferably from 1:5 to 1:60; catalyst to aromatic carboxylic acid halides, from 1:5 to 1:120, preferably from 1:10 to 1:90; catalyst to aromatic sulfonic acid esters, from 1:100 to 1:300, preferably from 1:150 to 1:250, and catalyst to alkyl sulfates from 1:150 to 1:500, preferably from 1:200 to 1:350. Preferably, the stoppers and stabilizers used are aromatic carboxylic acid halides, especially benzoyl chloride and Lewis acids, especially iron-(III) chloride, since these compounds are effective when used in relatively small amounts and hence polyisocyanates, possessing carbodiimide groups, which only contain extremely small amounts of foreign substances are obtained.

The polyisocyanates, possessing carbodiimide groups, according to the invention have isocyanate contents of from 25 to 35% by weight, preferably from 28 to 31% by weight, based on the total weight of the reaction product, and usually have viscosities of from 20 to 300, preferably from 22 to 100, cp/20° C.

The products exhibit excellent storage stability, are liquid and show virtually no tendency to crystallize. They may be used in combination with, for example, polyols, e.g. polyesters, polyethers and polyacetals, and the like which contain hydroxyl groups, for the manufacture of foams, preferably rigid foams, coatings, adhesives and elastomers.

EXAMPLE 1

30 kg of 4,4'-diphenylmethane-diisocyanate are fused, and heated to 60° C., in a 40 liter stirred kettle, under a nitrogen atmosphere. 0.9 g of 1-phenyl-3-methylphospholine-1-oxide is added to the melt; the latter is then heated to 80° C. and the condensation is carried out at this temperature for 67 minutes. In the course thereof, the isocyanate content of the reaction product fell from 33.6% by weight to 29.1% by weight. The polyisocyanate, possessing carbodiimide groups, which had a viscosity of 31 cp/20° C. and exhibited a strong absorption band in the infrared spectrum at 4.45μ and other bands at 5.85μ and 7.3μ, was divided into portions, in which the condensation reaction was stopped and the product stabilized at the same time.

The stoppers and stabilizers used, the amounts employed, the NCO contents and the viscosities of the end product after 1, 3 and 6 months' storage at room temperature are listed in Table 1 for Examples 1(a)–1(d) which are according to the invention and 1(e) which is comparative.

EXAMPLES 2 - 12

On following the procedure described in Example 1, but varying the diisocyanates, the catalyst concentration and the stoppers and stabilizers, the polyisocyanates, possessing carbodiimide groups, listed in Table 2 are obtained.

Catalyst type I: a solution of 10 parts by weight of 1-phenyl-3-methylphospholine-1-oxide in 90 parts by weight of methyl ethyl ketone.

Catalyst type II: a solution of one part by weight of 1-phenyl-3-methylphospholine-1-oxide in 80 parts by weight of methyl ethyl ketone.

TABLE 1

| Ex. | Polyisocyanate, possessing carbodiimide groups, according to Example | Amount (g) | Stopper and stabilizer Constitution | Amount (g) | Storage time (months) | NCO content (% by weight) | Viscosity (cp/20° C) |
|---|---|---|---|---|---|---|---|
| (a) | 1 | 3,000 | Benzoyl chloride | 0.9 | 1 | 28.1 | 80 |
|  |  |  |  |  | 3 | 28.0 | 106 |
|  |  |  |  |  | 6 | 27.6 | 142 |
| (b) | 1 | 3,000 | Benzoyl chloride | 3.0 | 1 | 28.4 | 71 |
|  |  |  |  |  | 3 | 28.3 | 86 |
|  |  |  |  |  | 6 | 27.5 | 162 |
| (c) | 1 | 3,000 | Methyl p-toluenesulfonate | 15.0 | 1 | 28.9 | 61 |
|  |  |  |  |  | 3 | 28.6 | 63 |
|  |  |  |  |  | 6 | 28.1 | 99 |
| (d) | 1 | 3,000 | Dimethyl sulfate | 15.0 | 1 | 29.0 | 59 |
|  |  |  |  |  | 3 | 28.8 | 47 |
|  |  |  |  |  | 6 | 28.4 | 92 |
| (e) | 1 | 3,000 | unstabilized | — | 0 | 29.1 | 31 |
|  |  |  |  |  | 1 | — | not measurable |

TABLE 2

| Examples | Diisocyanate Constitution | Amount (g) | Catalyst Type | Catalyst Amount (ml) | Reaction Temp. (°C) | Reaction Time (mins) | NCO content % by weight | Viscosity cp/20°C | Stopper or stabilizer Constitution | Stopper or stabilizer Amount (mg) | Storage time | NCO content % by weight | Viscosity cp/20°C |
|---|---|---|---|---|---|---|---|---|---|---|---|---|---|
| 2 | Toluylene-diisocyanate | 1,800 | Type I | 0.5 | 80 | 145 | 34.4 | 38 | Iron(III) chloride (dissolved in 3 ml of methyl ethyl ketone) | 130 | Products are stable for more than 3 months | — | — |
| 3 | " | 1,800 | " | 1.0 | 80 | 364 | 29.0 | — | " | 206 | | — | — |
| 4 | " | 1,800 | " | 1.5 | 80 | 410 | 25.8 | — | " | 209 | | — | — |
| 5 | Mixture of toluylene-diisocyanate (TDI) and 4,4'-diphenyl-methane-diisocyanate (MDI) | 900 / 900 | " | 0.54 | 80 | 240 | 31.2 | 63 | Iron(III) chloride dissolved in 5 ml of methyl ethyl ketone | 126 | | — | — |
| 6 | Mixture of TDI MDI | 540 / 1,260 | " | 0.54 | 80 | 185 | 30.7 | 45 | " | 126 | | — | — |
| 7 | Mixture of TDI MDI | 360 / 1,440 | " | 0.54 | 80 | 130 | 30.8 | 29 | " | 126 | — | — | — |
| 8 | Mixture of TDI MDI | 180 / 1,620 | " | 0.54 | 80 | 110 | 30.5 | 29 | " | 126 | | — | — |
| 9 | 4,4'-Diphenyl-methane-diisocyanate | 600 | Type II | 1.6 | 80 | 60 | 29.2 | 35 | Benzoyl chloride | 600 | 3 months | 27.1 | 153 |
| 10 | " | 600 | " | 1.2 | 80 | 80 | 30.0 | 30 | " | 600 | 3 months | 28.1 | 92 |
| 11 | " | 600 | " | 0.8 | 80 | 115 | 29.9 | 34 | " | 600 | 3 months | 27.1 | 166 |
| 12 | " | 3,000 | " | 2.0 | 80 | 240 | 29.9 | 36 | " | 3,000 | 3 months | 27.3 | 83 |

We claim:

1. An improved storage-stable, liquid polyisocyanate possessing carbodiimide groups, which contains from about 25 to about 35% by weight, based on the total weight, of NCO groups, obtained by condensing a polyisocyanate in the presence of a catalyst selected from the group consisting of phospholine, phospholidine, phospholine oxide and phospholidine oxide wherein the improvement consists in that condensation has been stopped and the condensation product stabilized by a stopper selected from the group consisting of iron (III) chloride, benzoyl chloride, methyl-p-toluenesulfonate and dimethylsulfate.

2. A storage-stable, liquid polyisocyanate possessing carbodiimide groups, as claimed in claim 1, derived from 4,4'-diphenylmethane diisocyanate.

3. The polyisocyanate as claimed in claim 1, wherein the stopper is benzoyl chloride.

4. In a process for the manufacture of a storage-stable, liquid polyisocyanate possessing carbodiimide groups, which contains from about 25 to 35% by weight, based on the total weight, of NCO groups by condensing a polyisocyanate in the presence of a catalyst selected from the group consisting of phospholine, phospholidine, phospholine oxide and phospholidine oxide, the improvement which comprises: stopping the condensation, after reaching the desired degree of condensation, by a stopper selected from the group consisting of iron (III) chloride, benzoyl chloride, methyl-p-toluenesulfonate and dimethyl sulfate and at the same time stabilizing the product by means of the stopper.

5. A process as claimed in claim 4 wherein the polyisocyanate possessing carbodiimide groups contains from 28 to 31% by weight, based on the total weight, of NCO groups.

6. A process as claimed in claim 4 wherein the catalyst is employed in an amount of from about 0.0004 to 0.009% by weight, based on the weight of polyisocyanate.

7. A process as claimed in claim 4 wherein 4,4'-diphenylmethane diisocyanate or a mixture of 4,4'-diphenylmethane diisocyanate and toluylene diisocyanate is used as polyisocyanate starting material.

8. The process as claimed in claim 4, wherein the stopper is benzoyl chloride.

* * * * *